(12) United States Patent
Nesnidal et al.

(10) Patent No.: US 7,078,696 B2
(45) Date of Patent: Jul. 18, 2006

(54) MICROSPECTROMETER SYSTEM WITH SELECTABLE APERTURING

(75) Inventors: Renée C. Nesnidal, Oregon, WI (US); George Skupniewicz, Madison, WI (US); N. Simon Nunn, Verona, WI (US)

(73) Assignee: Thermo Electron Scientific Instruments Corporation, Madison, WI (US)

(*) Notice: Subject to any disclaimer, the term of this patent is extended or adjusted under 35 U.S.C. 154(b) by 79 days.

(21) Appl. No.: 10/786,178

(22) Filed: Feb. 25, 2004

(65) Prior Publication Data

US 2005/0178968 A1 Aug. 18, 2005

Related U.S. Application Data

(60) Provisional application No. 60/544,404, filed on Feb. 13, 2004.

(51) Int. Cl.
*G01J 5/02* (2006.01)
*G01J 3/00* (2006.01)

(52) U.S. Cl. .............. 250/339.07; 250/341.8; 250/347; 250/339.11; 250/353; 356/51

(58) Field of Classification Search .......... 250/341.8, 250/347, 353, 339.07, 339.11
See application file for complete search history.

(56) References Cited

U.S. PATENT DOCUMENTS

| | | | |
|---|---|---|---|
| 3,958,882 A | 5/1976 | Gast | |
| 4,784,488 A | 11/1988 | Doyle et al. | |
| 4,786,169 A | 11/1988 | Brierley et al. | |
| 4,852,955 A | 8/1989 | Doyle et al. | |
| 4,877,960 A | 10/1989 | Messerschmidt et al. | |
| 4,922,104 A | 5/1990 | Eguchi et al. | |
| 5,225,678 A * | 7/1993 | Messerschmidt | ....... 250/339.07 |
| 5,311,021 A | 5/1994 | Messerschmidt | |
| 5,377,003 A | 12/1994 | Lewis et al. | |
| 5,512,749 A | 4/1996 | Iddan et al. | |
| 5,581,085 A | 12/1996 | Reffner et al. | |
| 5,689,333 A * | 11/1997 | Batchelder et al. | ......... 356/326 |
| 5,864,139 A | 1/1999 | Reffner et al. | |
| 5,946,131 A | 8/1999 | Wells et al. | |
| 6,002,476 A | 12/1999 | Treado | |
| 6,006,140 A | 12/1999 | Carter | |
| RE36,529 E | 1/2000 | Lewis et al. | |
| 6,373,568 B1 | 4/2002 | Miller et al. | |
| 6,667,808 B1 | 12/2003 | Clermont et al. | |
| 2002/0033452 A1 | 3/2002 | Hoult et al. | |
| 2002/0034000 A1 | 3/2002 | Hoult et al. | |

* cited by examiner

*Primary Examiner*—David Porta
*Assistant Examiner*—Frederick F. Rosenberger
(74) *Attorney, Agent, or Firm*—Foley & Lardner LLP

(57) ABSTRACT

Mirror elements are selectively interposable in the beam paths in a dual aperture microspectrometer system to selectively bypass the aperture element in transmission or reflection modes to increase optical throughput and field of view. The system may be operated in a dual aperture transmission mode or reflection mode and in modes in which the aperture is bypassed before or after the infrared beam reaches the sample. The system may be operated to bypass the aperture both before and after the sample, which may be utilized with an array detector having multiple detector elements in which an image of the sample is formed on the array detector.

39 Claims, 6 Drawing Sheets

MICROSPECTROMETER SYSTEM WITH SELECTABLE APERTURING

CROSS-REFERENCE TO RELATED APPLICATION

This application claims the benefit of provisional patent application No. 60/544,404, filed Feb. 13, 2004, the disclosure of which is incorporated by reference.

FIELD OF THE INVENTION

This invention pertains generally to the field of microscopy and particularly to Fourier transform infrared spectroscopy.

BACKGROUND OF THE INVENTION

Fourier transform infrared (FTIR) spectrometers are widely used to determine the chemical composition of samples. In an FTIR spectrometer, a beam of infrared radiation is passed through an interferometer that modulates the wavelength content of the infrared beam in a periodic manner. The modulated beam is transmitted to a sample and the infrared light reflected from or transmitted through the sample is directed to a detector. The signal from the detector correlated with the modulation of the beam in the interferometer provides interferogram data that can be analyzed by Fourier transformation to provide the spectrum of absorption or transmission of the infrared light by the sample. These data can then be utilized to determine the chemical composition of the constituents of the sample. FTIR spectrometers can be combined with appropriate infrared microscopes to allow examination of samples on a microscopic level and to determine variations in the composition of the sample over an area of the sample. Examples of prior FTIR microscope systems are shown in U.S. Pat. Nos. 4,877,960, 5,581,085, and 5,864,139, which are incorporated herein by reference.

U.S. Pat. No. 5,864,139 discloses a microspectrometer system having a single confocal aperture used both in transmission and reflection microspectrometry, wherein during a transmission mode of operation as well as the reflection mode the light beam passes through the aperture in both a first direction and a second direction. Thus, a single aperture functions as a confocal aperture for both transmissive and reflective microspectrometry. The microspectrometer system shown in this patent can also be utilized to observe the sample in visible light at the same time that the sample is irradiated with infrared light for spectrometric analysis of the sample.

Typical prior microspectrometer systems have used a single element detector that analyzes all of the infrared light reflected from or transmitted through a selected small area of a sample. The field of view (FOV) of such single element detectors is restricted by the aperture through which the infrared beam passes to ensure that only light from the selected small area of the sample is analyzed. Microspectrometers may also be implemented using array detectors in which the light reflected from or transmitted through a larger area of the sample is imaged on an array formed of multiple individual detector elements so that each detector element views a different portion of the sample. The relatively large field of view required for detector arrays is generally difficult to accommodate in dual aperturing microspectrometer systems. The field of view in dual aperturing systems is limited physically by the position of the spherical mirrors used to focus or collimate the infrared beams. In order to expand the field of view, the incident angle to the spherical mirrors would need to be increased. However, larger incident angles lead to degradation in image quality because of aberrations introduced by off-axis spherical mirror reflections.

SUMMARY OF THE INVENTION

In accordance with the invention, mirror elements are selectively interposable to create alternate beam paths in a microspectrometer system in reflection or transmission that can selectively utilize differing aperture or sample masking arrangements to allow for an increased optical throughput and field of view. The system may be operated in normal dual aperture modes which maintain the minimized angle of incidence with the spherical mirrors, and thus maintain the overall image quality obtained from dual aperturing, and in no aperture modes in which the aperture is bypassed before and after the sample. By redirecting the beams to bypass the aperture, a shorter beam path can be obtained than if the aperture were removed or opened in size. In addition to the dual aperture and no aperture modes, the system of the invention also can selectively interpose mirror elements in the beam paths to allow pre- or post-sample aperturing to improve signal resolution or signal-to-noise ratio for single element detector applications. For example, in diffuse reflectance spectrometry, a pre-sample aperture may be utilized to define the sampled area without utilizing a post-sample aperture which would otherwise reduce the overall signal while providing no improvement in spatial resolution. The available combinations of the various aperture options allow the user to determine a desired tradeoff between signal-to-noise ratio, spectral range, and spatial resolution when collecting a spectrum from a relatively small sample.

The operation of the microspectrometer of the invention with an expanded field of view in the mode in which the aperture is bypassed is particularly well suited for use with an array detector. Alternatively, in certain applications in which an array detector having multiple detector elements is used, it may be desirable to provide pre-sample or post-sample aperturing for purposes of increasing the signal-to-noise ratio. Such modes of operation allow the user to select a tradeoff between signal-to-noise and spatial resolution when collecting spectra from a small portion of a relatively large sample. The array detector itself provides a stop in the system, so that the removal of one or the other of the apertures from the beam path increases the available signal. Furthermore, the size of the stop created by the array detector can be altered electronically by sampling a subset of detector element pixels or by combining signals from adjacent pixels. For example, a 300 micron sample can be initially viewed and sampled using a full focal plane array. If a 20 micron portion of the sample is found in this initial viewing to be of interest, the user can center that portion of the sample using the microscope stage, and the aperturing mode can then be selected and optimized. The detector element pixels that fall outside the area of interest can be disabled (windowed) and pixels inside the area of interest can be combined together. Carrying out detection in this manner is particularly advantageous if a pixel size is close to the diffraction limit, since the spectra from an individual pixel is already affected by spillover from adjacent pixels, and windowing and combining of the output signals from detector pixels can increase the speed of data processing.

Further objects, features and advantages of the invention will be apparent from the following detailed description when taken in conjunction with the accompanying drawings.

DETAILED DESCRIPTION OF THE INVENTION

The microspectrometer system of the present invention is utilized to carry out Fourier transform infrared spectrometry of selected areas of a sample being examined. The microspectrometer system of the invention may carry out both reflection and transmission spectral analysis of a sample as well as allowing visual examination of the sample. For purposes of exemplifying the invention, a simplified perspective view of the optical elements of the microspectrometer system of the invention is shown generally at 10 in FIG. 1, having the basic optical structure as set forth in U.S. Pat. No. 5,864,139, entitled Confocal Microspectrometer System, which is incorporated herein by reference. Additional features of such systems are described in U.S. Pat. No. 5,581,085, which is also incorporated herein by reference. Conventional parts for the microspectrometer system, such as the housing, frame, mounts for the various optical components, and drive motors for operating the various movable optical components, are not shown for clarity of illustration. It is understood that these components are conventional and are readily implemented using conventional structures and techniques well known to those of ordinary skill. The optical components utilized in double aperturing transmission and reflection spectrometry are substantially the same as that described in U.S. Pat. No. 5,864,139, where further details of the microspectrometer system are provided.

Figure 1:
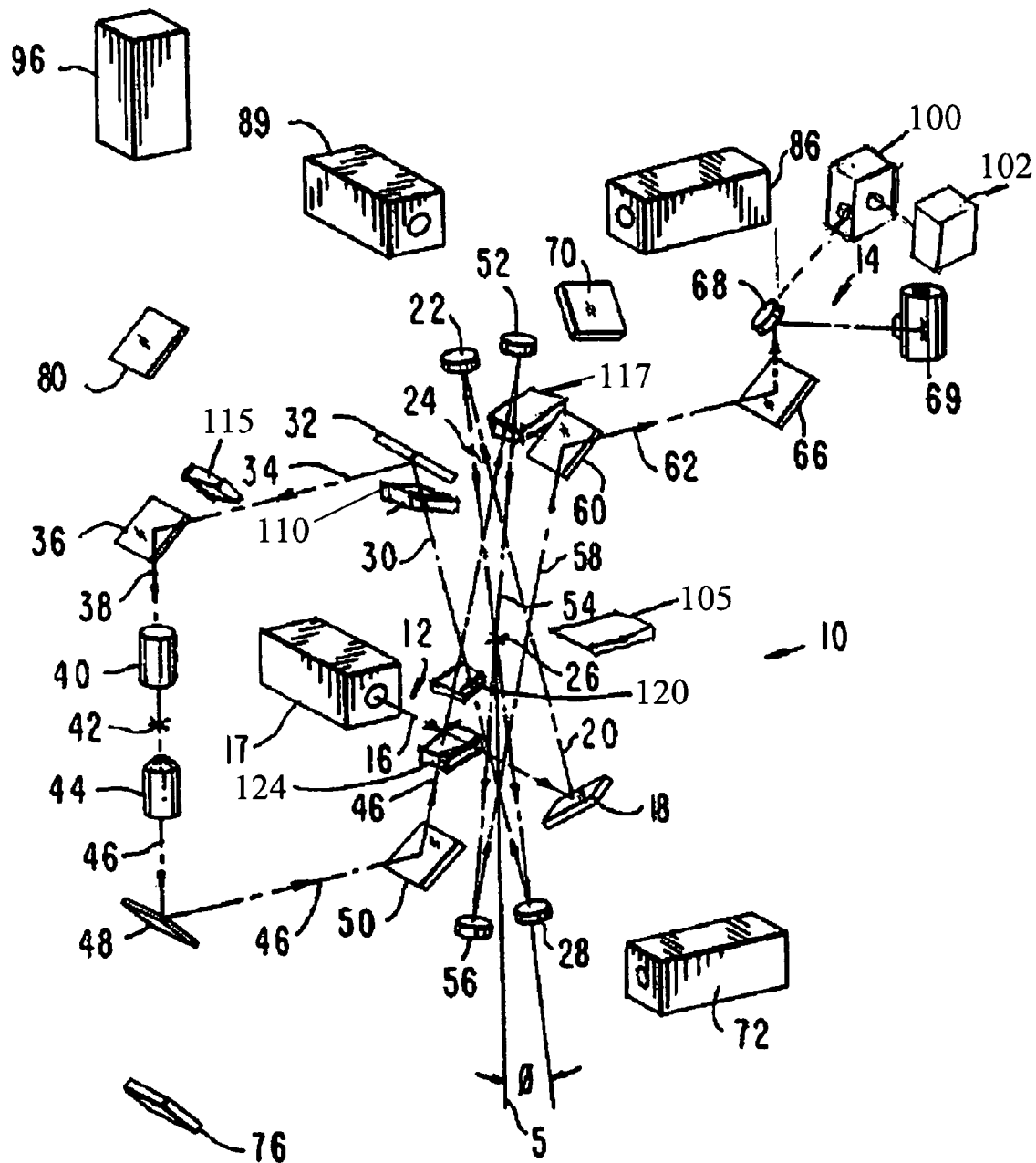
FIG. 1 is a simplified perspective view of the optical elements of a microspectrometer system in accordance with the invention.

The infrared microscope of the microspectrometer system 10 may have an entry window through which input optical signals are received and includes an input port 12 to which a substantially collimated infrared beam 16 is applied. The collimated infrared beam 16 may be provided from an infrared source 17 such as an FTIR spectrometer which provides a modulated output beam from an interferometer within the spectrometer. An example of an FTIR spectrometer is shown in U.S. Pat. No. 6,667,808, but any spectrometer that provides a suitable modulated infrared beam may be used. The collimated input beam 16 is reflected by a flat mirror 18 as a beam on an input beam path 20 that is directed to a first curved focusing mirror 22. The first curved focusing mirror 22 may be spherically shaped and focuses the input beam 20 into a focused beam 24, which is directed to an aperture element having an aperture 26 which defines a conjugate field plane. The aperture 26 limits the cross-sectional area of the focus of the beam 24. The aperture 26 preferably has a variable diameter that can be selected by the user, in a manner similar to the iris of a camera. After passing through the aperture 26, the beam 24 is directed to a second curved mirror 28, e.g., of spherical shape, which recollimates the beam 24 into a collimated beam 30 which is reflected by a first flat mirror 32 into a beam 34. The beam 34 is directed to a first reflective element 36 that functions as a dichroic beamsplitter for passing visible wavelengths and reflecting infrared wavelengths into a beam 38. If desired to allow for an additional visual illumination or viewing axis, an additional dichroic beam splitter and mirror may be included in the reflective element 36. Where visual inspection of the sample is not required or is obtained in other ways, the element 36 may be eliminated or may be a simple infrared mirror. The reflective element 36 directs the reflected beam 38 into microscope optics which may include an infinity corrected microscope objective 40 that focuses the collimated beam 38 to a focus point at a sample plane 42 at which a sample may be mounted and on which spectral analysis is to be performed. In transmission mode analysis, the sample plane has a transparent sample mounted on it through which the beam 38 is directed for forming an image of the aperture 26 on the sample. The image beam exiting the sample is provided to a condenser 44 which recollimates the image beam and directs it in a transmitted beam 46 to a second reflective element 48. The objective 40 and condenser 44 are conventionally formed of infrared reflective optics, e.g., Cassegrain reflective optics and particularly Schwarzschild optics. The second reflective element 48 may include a dichroic material for reflecting infrared light on a beam path 46 to a second flat mirror 50 while passing visible light. A third curved focusing mirror 52 receives the beam 46 and focuses the beam 46 back through the aperture 26 as a focused beam 54. After passing through the aperture, the beam 54 is directed to a fourth curved spherical mirror 56 which recollimates the focused beam into a collimated output image beam on an output beam path 58 which as shown in the example system of FIG. 1 is directed via a reflective element or mirror 60 to an output terminal of the microscope system. The reflective element 60 reflects the image beam 58 into a beam 62 which is reflected by a mirror 66 to an optical element 68. The optical element 68 is formed to refocus the beam 62 on a single element infrared detector 69 which provides a signal indicative of the infrared light reviewed by it. The element 68 or the flat mirror 66 may be mounted to pivot to redirect the beam 62 via correction optics 100 (as described further below) to a multiple element array detector 102 (rather than to the single element detector 69), which provides a signal or signal indicative of the infrared light received by the detector elements of the array detector. The signal(s) from the detectors may then be analyzed by, e.g., an FTIR spectrometer which functions as the source 17.

To allow visual inspection of the sample in both the transmission and reflection modes, visible light sources 72, 86 and 89, reflective elements 70, 76 and 80, and a viewing mechanism 96 such as an eyepiece or video camera may be provided. The operation of these elements in the dual aperture transmission and reflection modes is discussed in detail in U.S. Pat. No. 5,864,139. To allow operation of the microspectrometer system 10 in a dual aperturing reflection mode, a sluice mirror 105 is mounted for moving between a transmission mode position in which it is entirely out of the beam 20 to a reflection mode position in which it partially blocks the beam 20 and partially passes it. The upper surface of the sluice mirror 105 (as it is seen in FIG. 1) is formed as a reflective mirror surface for use as discussed further below. The operation of the sluice mirror 105 is also discussed in U.S. Pat. No. 5,864,139 (shown at 130 in FIGS. 4 and 5 of that patent).

In accordance with the present invention, additional optical mirror elements are selectively interposable in the beam paths between the infrared source 17 and the detector(s) to define beam paths which direct the beam to bypass the aperture 26 before the sample, after the sample, or both. As illustrated in FIG. 1, the additional selectively interposable elements include a mirror 110 which is mounted to move between positions out of and in the input beam path 20 and may be mounted to move to a position in which it is only partially in the input beam path, a sluice mirror 115 which is mounted to move between a position entirely out of the beam path 34 to a position partially reflecting and partially passing a beam on the beam path 34, a mirror element 117 which is mounted to move into and out of the beam path 20, a mirror element 120 which is mounted to move into and out of the beam path 46 between the mirrors 50 and 52, and a mirror 124 which is mounted to move into and out of the output beam path 58 between the mirror elements 56 and 60. In addition, the mirror 32 is mounted for rotation about a pivot axis to pivot between two positions at approximately right angles to each other, and it is also mounted to move as a sluice mirror from a position entirely reflecting a beam on the beam path 34 to a position partially blocking and partially passing the beam path 34. Mounting and drive mechanisms for movement (such as rotation or flipping) of such mirrors are conventional and well known in the art. For example, commercial stepper motors may be used to drive the mirrors between their repositioning.

The various modes in which the microspectrometer system of the present invention may be operated are illustrated schematically in FIGS. 2–9. These figures show the beam paths and the relevant optical elements for directing the beam path from the source to the sample and thence on a beam path which may be directed to the detector or detectors. Elements which are not essential to a description of operation of the invention are not shown in these figures for clarity.

Figure 2:
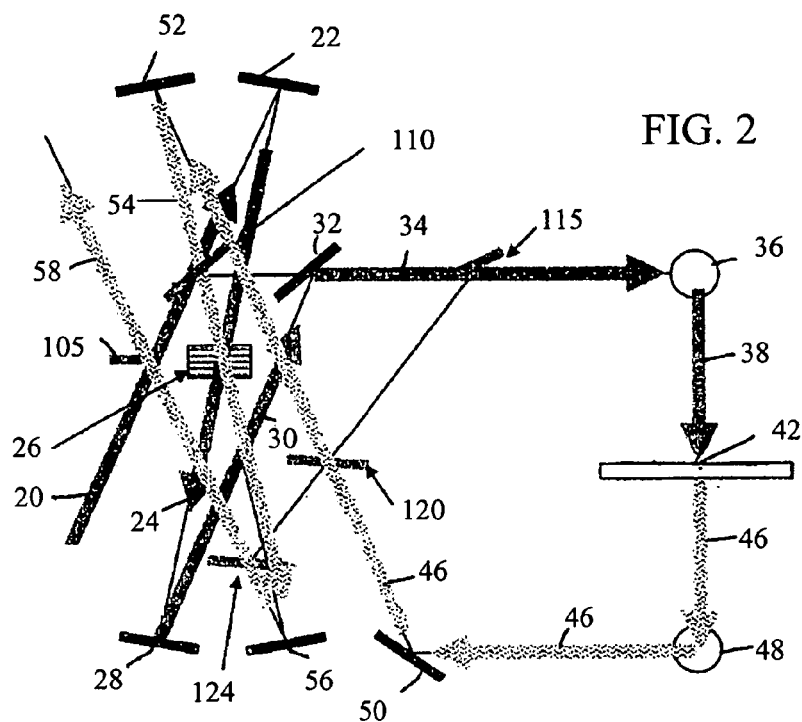
FIG. 2 is a schematic view of the optical elements in an infrared light path in the system of the invention in a transmission dual aperture mode.

FIGS. 1 and 2 illustrate the beam paths in the transmission dual-aperture mode in which the beam passes through the aperture 26 both before and after the beam passes through the sample. This is one of the modes of operation of the microspectrometer system shown in U.S. Pat. No. 5,864,139. In this mode, the beam 20 from the source reflects off the spherical mirror 22 through the aperture 26 to a mirror 28, thence to a mirror 32, to the dichroic assembly 36, to the sample 42, to the dichroic mirror 48, to the mirror 50, to the mirror 52 which refocuses the beam 54 through the aperture 26, and thence to the mirror 56 which reflects the beam into the output beam 58 that is directed to the detector. The sluice mirror 105 and the optical elements 110, 115, 117, 120 and 124 are completely out of the beam paths in this mode. For simplicity of illustration, the objective 40 and condenser 44 are not shown in FIG. 2 as well as in the rest of FIGS. 3–9.

Figure 3:
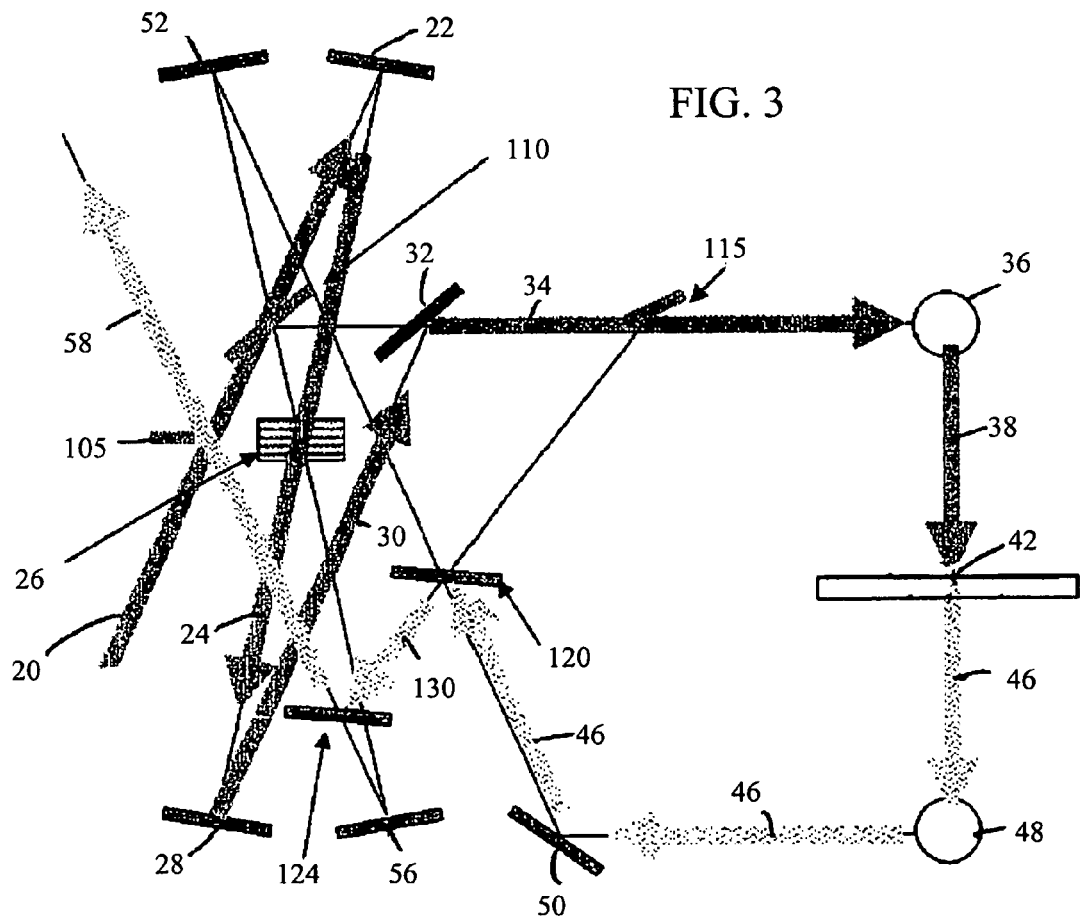
FIG. 3 is a schematic view of the optical elements in an infrared light path in the system of the invention in a transmission pre-sample aperture mode.

In accordance with the invention, the microspectrometer system may be operated in a transmission pre-sample aperture mode as shown in FIG. 3 in which the beam passes through the aperture before the sample but not after passing through the sample. In this mode, the mirror 120 is interposed in the beam path 46 between the mirrors 50 and 52, and the mirror 124 is interposed in the output beam path 58. The input beam from the input beam path 20 follows the beam paths 24, 30, 34 and 38 to the sample 42, and the beam 46 transmitted through the sample follows the original beam path until it passes the mirror 50. At this point, the beam 46 that is reflected by the mirror 50 is intercepted by the mirror 120, which reflects the light in a beam 130 toward the mirror 124. Thus, the beam 46 does not reach the mirror 52 and does not pass through the aperture 26. The beam 130 is reflected from the mirror 124 directly onto the output beam path 58 leading to the detector, thus providing a beam path from the sample to the detector without passing through the aperture 26.

Figure 4:
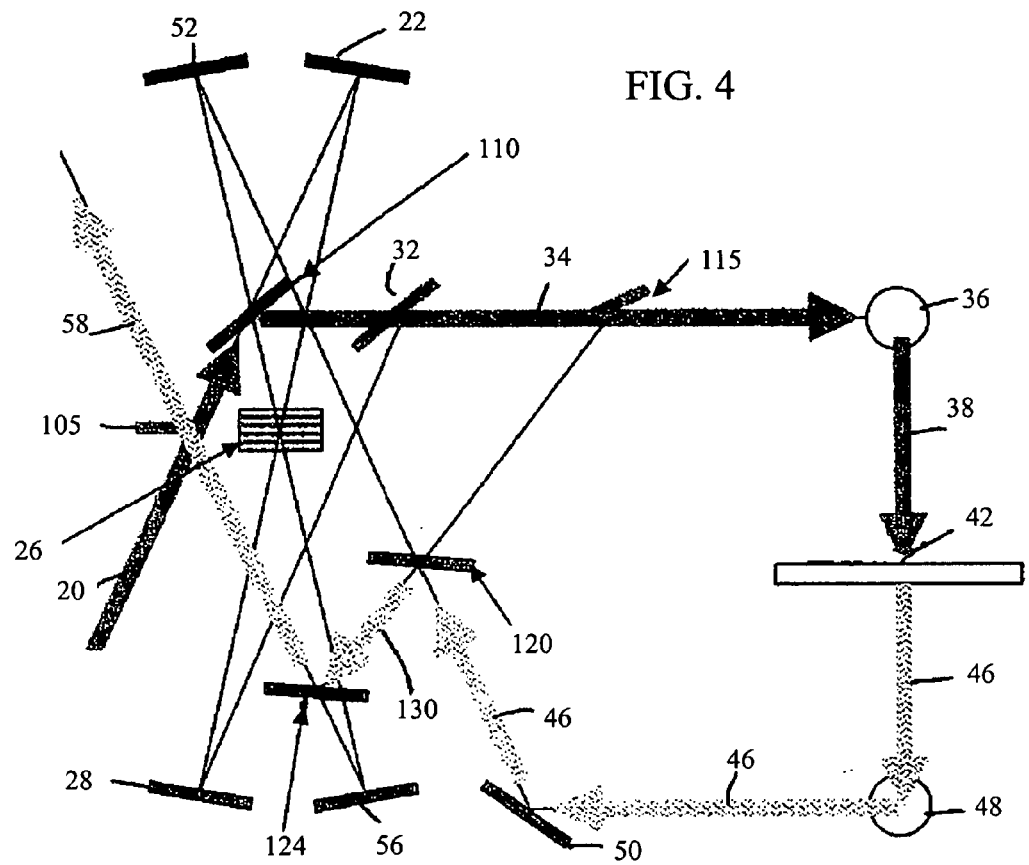
FIG. 4 is a schematic view of the optical elements in an infrared light path in the system of the invention in a transmission mode with no aperture.

FIG. 4 illustrates the beam paths in accordance with the invention in a transmission no aperture mode. This mode is particularly useful for imaging a sample onto an array detector. In this mode, the mirror 110 is interposed into the incoming beam path 20 before it reaches the mirror 22, the mirror 120 is interposed in the beam path 46 between the mirrors 50 and 52, and the mirror 124 is interposed into the output beam path 58. The mirror 110 is interposed into the beam path 20 to reflect that beam directly onto the beam path 34 and thence to the sample 42 without passing through the aperture 26. The beam 46 transmitted through the sample 42 is reflected by the dichroic mirror 48 and the mirror 50, and the beam 46 that is reflected by the mirror 50 is intercepted by the mirror 120 which reflects it on the beam path 130 to the mirror 124, from whence the beam passes onto the output beam path 58. In this manner, both the pre-sample beam and the post-sample beam bypass the aperture 26.

Figure 5:
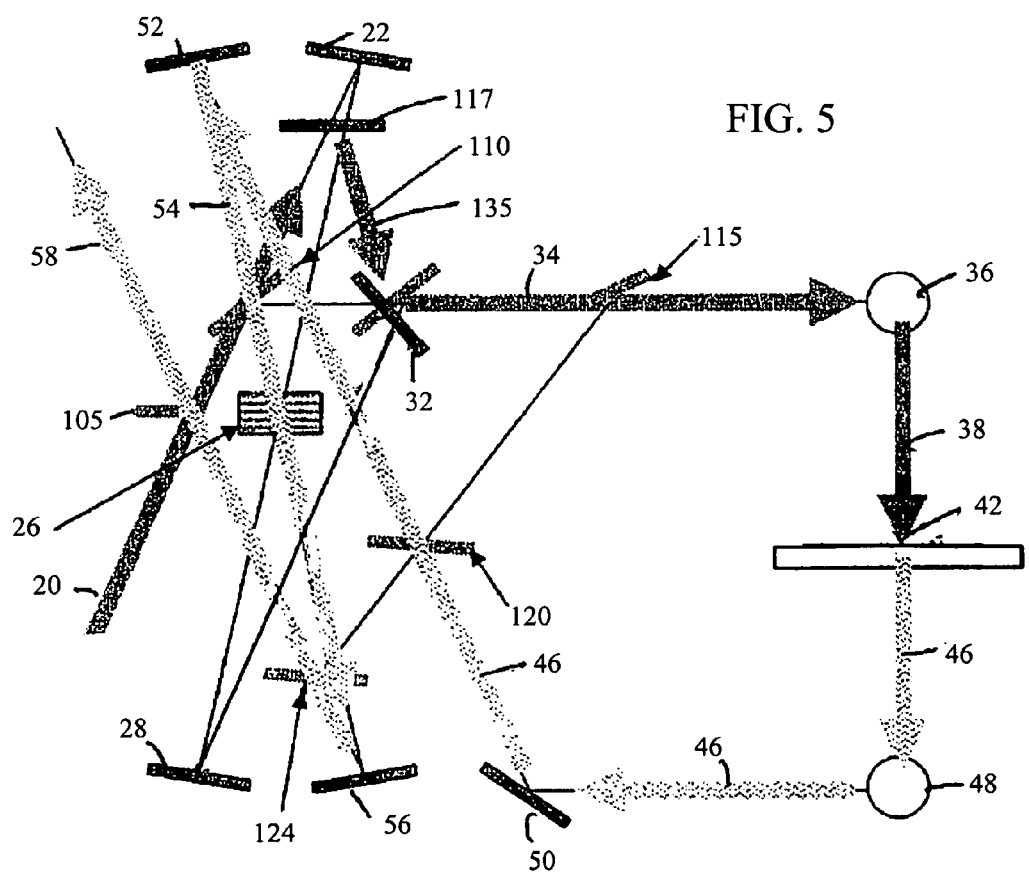
FIG. 5 is a schematic view of the optical elements in an infrared light path in the system of the invention in a transmission post-sample aperture mode.

FIG. 5 illustrates the transmission post-sample aperture mode of operation of the invention in which the aperture is bypassed on the incoming beam that reaches the sample, while the beam that has been transmitted through the sample is passed through the aperture before reaching the detector. In this mode, the mirror element 117 is interposed in the incoming beam path 20 before the beam reaches the mirror 22 and reflects the incoming beam onto a beam path 135 toward the mirror element 32. The mirror element 32 is flipped as shown in FIG. 5, to a position approximately 90° from its normal transmission position, as illustrated in FIG. 1, so as to reflect the beam 135 onto the beam path 34. After the beam is reflected onto the beam path 34, it follows the normal transmission beam paths 38, 46, 54 (passing through the aperture 26), and 58 before reaching the detector.

Figure 6:
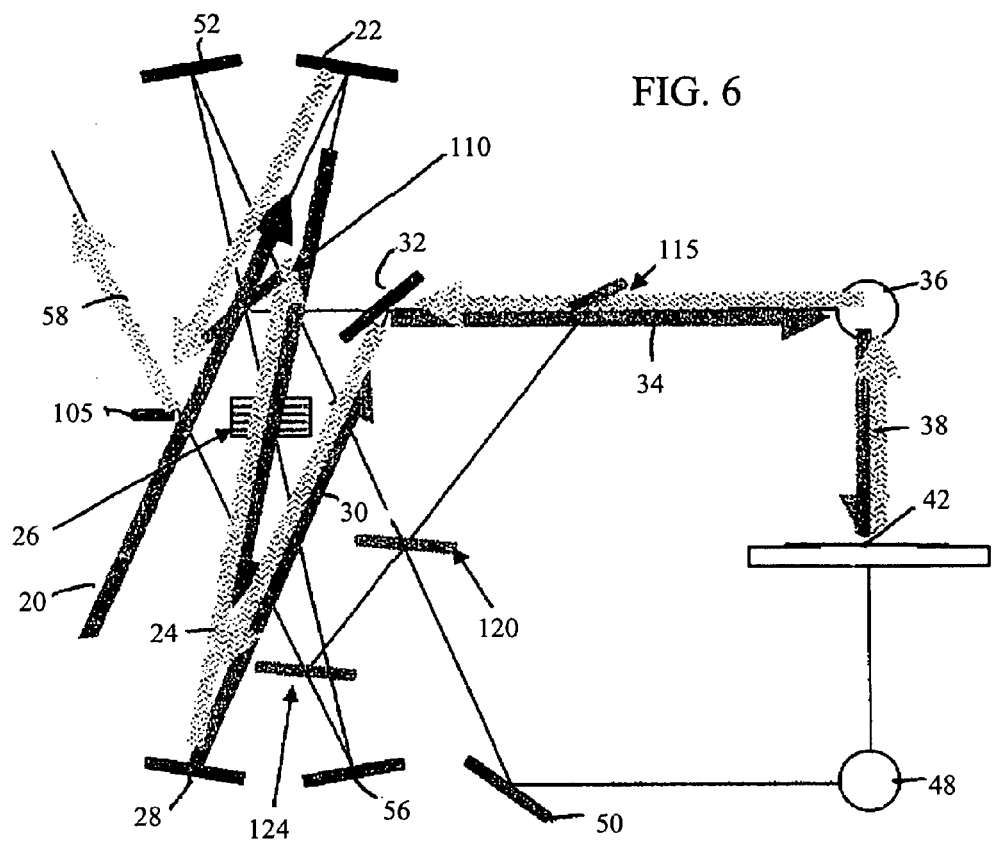
FIG. 6 is a schematic view of the optical elements in an infrared light path in the system of the invention in a reflection dual aperture mode.

FIG. 6 illustrates the positions of the optical elements in the reflection dual aperture mode, which corresponds to the arrangement of FIG. 4 of U.S. Pat. No. 5,864,139. Reflection analysis of a sample may include, for example, reflected image, diffuse reflection, grazing angle reflection, and attenuated total reflectance (ATR). In the reflective dual aperture mode, the beam from the source on the beam path 20 is partially intercepted by the sluice mirror 105, which blocks about half the beam and passes the rest of the beam on the beam path 20 to the mirror 22. The beam 24 that is reflected from the mirror 22 is focused at the aperture 26, and after passing through the aperture is reflected by the mirror 28 onto the beam path 30, and is then reflected by the mirror 32 onto the beam path 34 where it is reflected by the dichroic mirror 36 onto the beam path 38 and thence to the sample 42. The objective 40 focuses the incoming beam which occupies half of the beam path 38 onto the sample 42. The light reflected from the sample 42 passes backward on the beam path 38, occupying the opposite half of the beam path 38 from the incoming beam. The beam reflected from the sample on the beam path 38 is reflected by the dichroic mirror 36 into the beam path 34 and then backwardly on the beam paths 30, 24 (through the aperture 26) to the mirror 22. The reflected beam on these beam paths shares the beam path with the incoming beam, with the incoming and reflected beams occupying opposite halves of the beam paths. The return beam as reflected by the mirror 22 is collimated and returns on the beam path 20 alongside the incoming beam until it is intercepted by the sluice mirror 105. The top surface of the sluice mirror 105 is a mirror and reflects the returning reflected light onto the output beam path 58 where it is then directed to the detector. In this manner, both the incoming beam and the reflected beam pass through the aperture 26 on the same beam path, each occupying about ½ of the beam path. In this mode, the intercept elements 110, 115, 117, 120 and 124 are in positions out of the beam paths on which the incoming and reflected beams travel.

Figure 7:
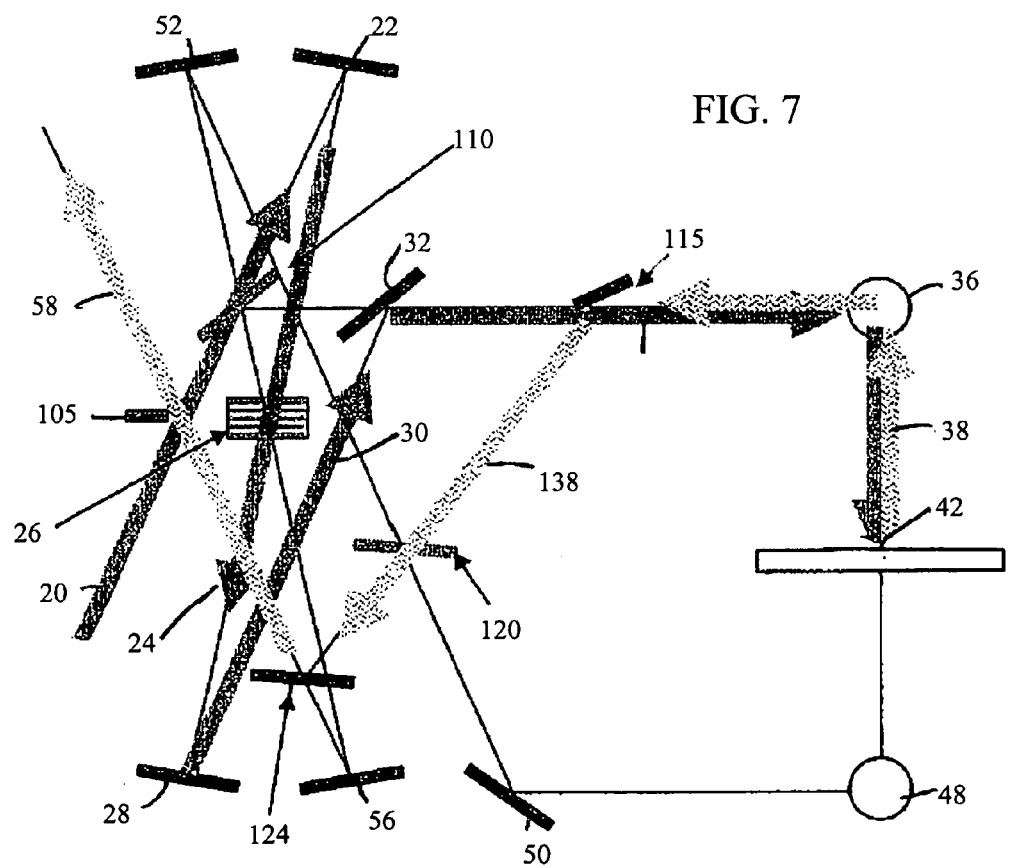
FIG. 7 is a schematic view of the optical elements in an infrared light path in the system of the invention in a reflection pre-sample aperture mode.

In accordance with the present invention, the microspectrometer system can operate in a reflection pre-sample aperture mode having the beam paths as shown in FIG. 7. In this mode, in addition to the sluice mirror 105 being interposed partially into the beam path 20, a sluice mirror 115 is partially interposed into the beam path 34 and the mirror 124 is interposed into the beam path 58. The incoming beam paths are similar to what is shown in FIG. 6, with the incoming beam 20 being partially blocked and partially passed by the sluice mirror 105, reflected off of the mirror 22 as a focused beam 24 which passes through the aperture 26. The beam 24 is reflected by the mirror 28 onto the beam path 30, and the beam on the beam path 30 is reflected by the mirror 32 onto the beam path 34. The sluice mirror 115 passes the incoming beam which occupies about the lower half of the beam path 34. The incoming beam that is passed on the beam path 34 is reflected by the dichroic mirror 36 onto the beam path 38 where it is focused onto the sample 42. The light reflected from the sample passes back up the beam path 38, with the incoming and returning beams each occupying about one-half of the beam path, and with the returning beam above the incoming beam. The returning beam is then reflected by the dichroic mirror 36 onto the beam path 34 where it is intercepted by the sluice mirror 115 (the incoming beam passes under the sluice mirror 115) and diverted onto a beam path 138 to the mirror 124. The mirror 124 reflects the beam on the beam path 138 onto the exit beam path 58 from whence it is directed to the detector. If the sample is somewhat transparent, the light transmitted through the sample can be blocked by the plate on which the sample is mounted or by a light absorber interposed in the transmitted beam path, or the condenser can be lowered to defocus it. In this manner, the incoming beam is passed through the aperture 26 but the reflected beam from the sample bypasses the aperture.

Figure 8:
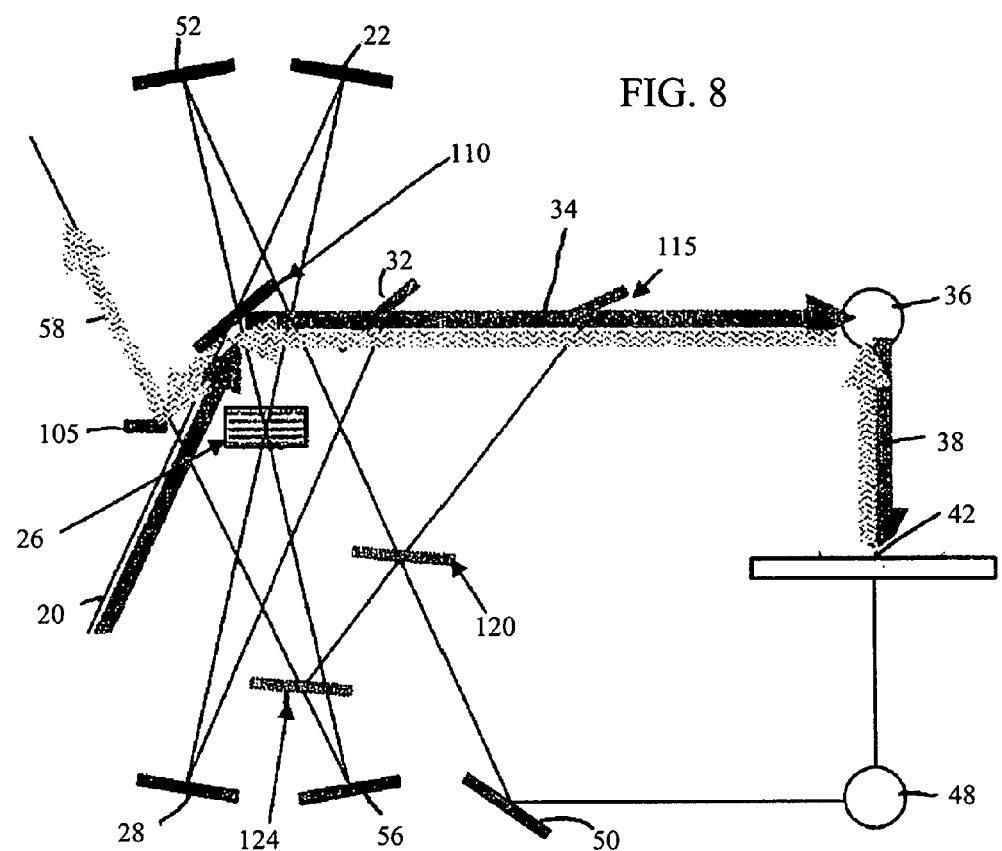
FIG. 8 is a schematic view of the optical elements in an infrared light path in the system of the invention in a reflection mode with no aperture.

The microspectrometer of the invention can be operated in a reflection no aperture mode having the beam paths as shown in FIG. 8. In this mode, the mirror 110 is interposed into the incoming beam path 20 and reflects the portion of the beam on the beam path 20 that is not intercepted by the sluice mirror 105. The beam that is reflected by the mirror 110 passes on the beam path 34 past both the mirrors 32 and 115, both of which are moved to a position out of the beam path 34. The incoming beam is reflected by the dichroic mirror 36 onto the beam path 38 where it is focused onto the sample 42. The incoming beam and the beam reflected from the sample each occupy about a half of the beam path 38. The returning beam is reflected by the dichroic mirror 36 back onto the beam path 34 where it is reflected by the mirror 110 toward the sluice mirror 105. The returning beam occupies a different portion of the beam path 20 than the incoming beam and is positioned to be intercepted by the sluice mirror 105, which reflects the returning beam onto the output beam path 58 from whence it is directed to the detector. In this manner, both the incoming and return beams bypass the aperture 26.

Figure 9:
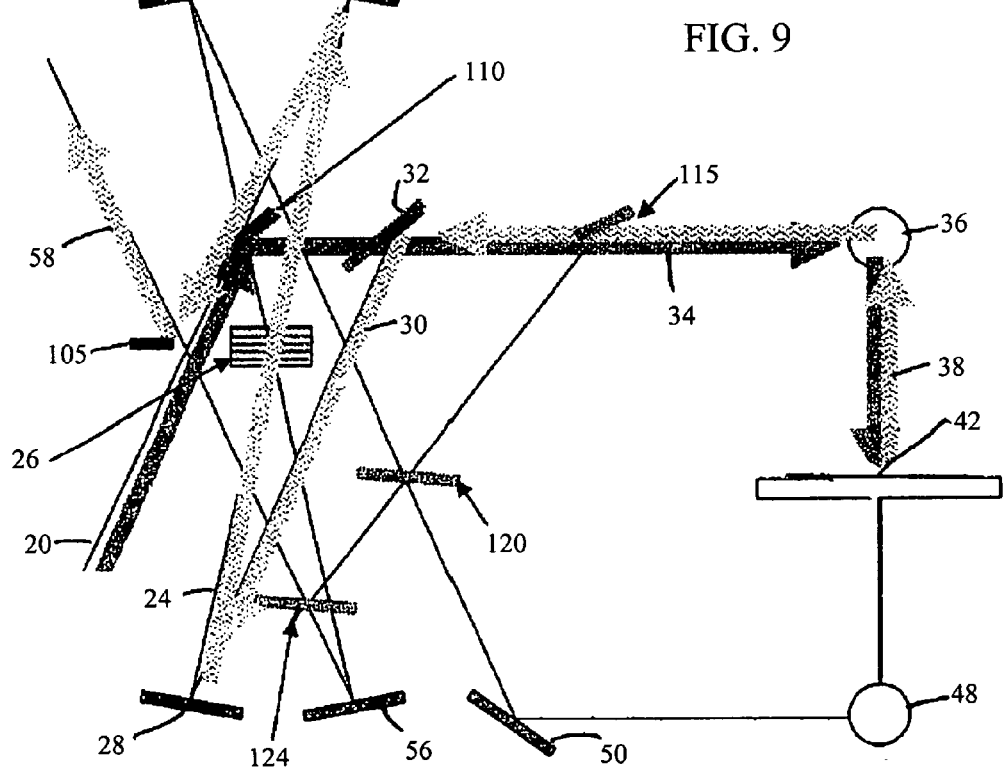
FIG. 9 is a schematic view of the optical elements in an infrared light path in the system of the invention in a reflection post-sample aperture mode.

The microspectrometer of the invention may be operated in a reflection post-sample aperture mode having the beam paths as illustrated in FIG. 9. In this mode, in a manner similar to the reflection no aperture mode of FIG. 8, an incoming beam on the beam path 20 is partially intercepted by the sluice mirror 105, and the portion of the incoming beam that passes the sluice mirror is reflected by the mirror 110 onto the beam path 34. In this mode, the mirror 110 is moved to a position where it also acts as a sluice mirror as explained further below. The light reflected from the mirror 110 onto the beam path 34 passes by the mirror 32 which is now mounted in a position partially in and partially out of the beam path 34. The incoming beam on the beam path 34 is reflected by the dichroic mirror 36 onto the beam path 38 where it is focused onto the sample 42. The light reflected on the sample returns on the beam path 38, with the incoming and returning beams each occupying about half of the beam path, and the return beam is reflected by the dichroic mirror 36 onto the beam path 34. The returning beam on the beam path 34 is intercepted by the mirror 32 and is directed onto the beam path 30 where is reflected by the spherical mirror 28 onto the focused beam path 24 which passes through the aperture 26. The beam that passes on the beam path 24 through the aperture is reflected by the spherical mirror 22 onto the beam path 20 at a position on the beam path that bypasses the edge of the mirror 110 and which is intercepted by the sluice mirror 105, which reflects the beam onto the output beam path 58 from whence it is directed to the detector. In this manner, the incoming beam bypasses the aperture 26 while the return beam is passed through the aperture.

Figure 10:
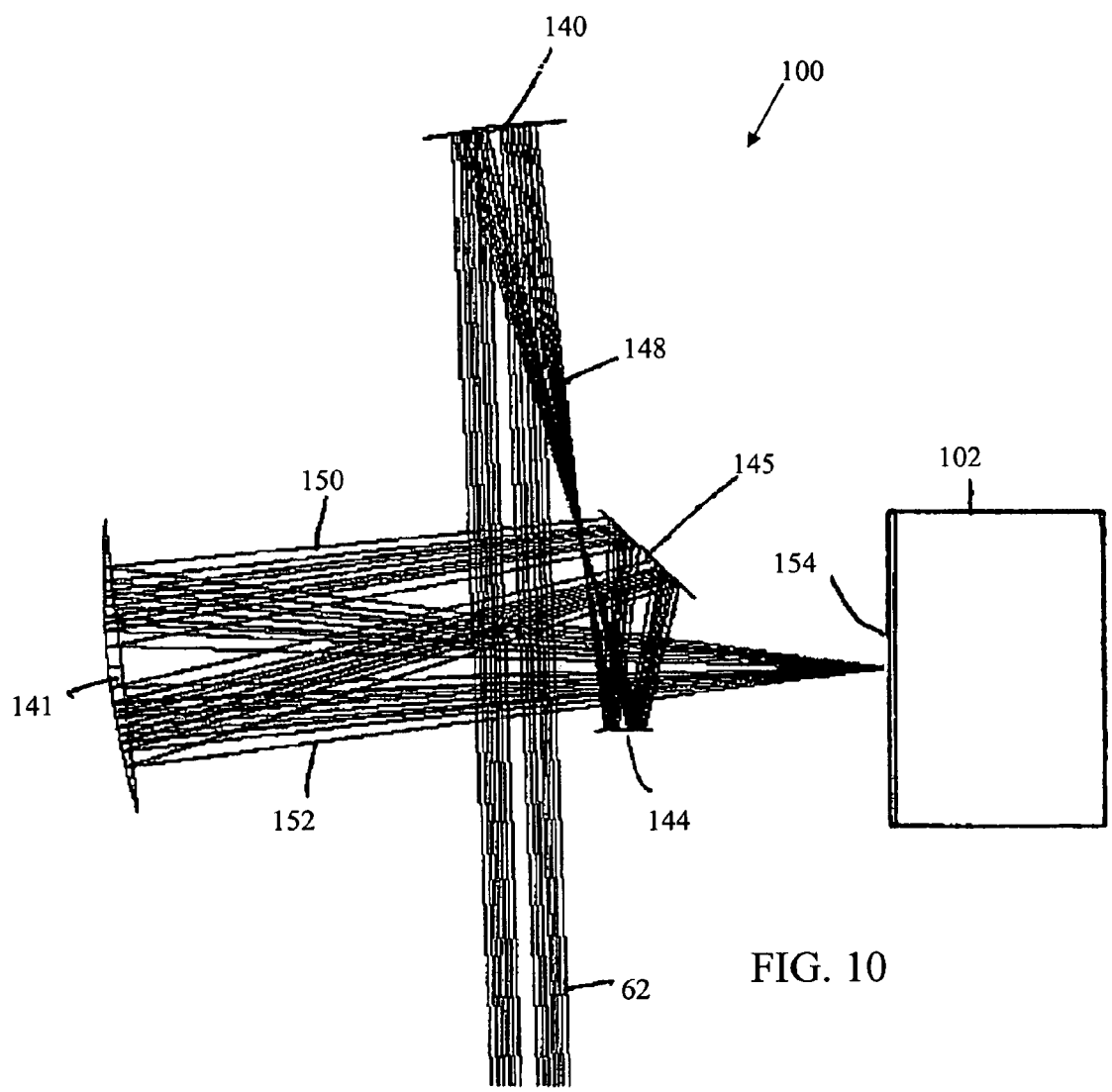
FIG. 10 is a simplified view of correction optics for imaging the sample on an array detector.

The present invention allows the use of an array detector having multiple detector elements or pixels arranged in an array so that light reflected from or transmitted through an area of the sample can be imaged onto the detector array. To allow imaging of a sample onto the image plane of the array detector (rather than focusing the light from the sample onto a single detector element), an imaging optical train 100 may be used. The optics 100 preferably provide magnification to match the optical field of view at the sample to the array size at the array detector 102. An example of a suitable optical system 100 is shown in FIG. 10. The optical system 100 utilizes two spherical mirrors 140 and 141, a cylindrical corrector mirror 144, and a folding mirror 145. The incoming beam 62 (a beam redirected from the beam path 58 by the mirrors 60, 66 and 68) is reflected by the spherical mirror 140, which is tilted at an angle to the axis of the beam 62, and the beam 148 reflected from the mirror 140 is reflected by the cylindrical corrector mirror 144 to the flat folding mirror 145, which reflects the beam onto a beam path 150 to the spherical mirror 141. The spherical mirror 141 reflects the light onto a beam 152 which forms an image at the image plane 154 of the detector 102. The tilted spherical mirrors 140 and 141 can be arranged to tilt in opposite directions to compensate for spherical aberrations. The tilt of these mirrors can also introduce astigmatism, and the cylindrical mirror 144 is provided to adjust the focus along one axis with respect to the other axis to compensate for the astigmatism. The folding mirror 145 reduces the overall space occupied by the optical train. The image formed at the image plane 154 can be detected utilizing various types of detectors. In general, the detector optical correction system 100 is specific to a particular detector and may be modified and selected to match the detector element size and the housing of the particular detector being used. A two-dimensional detector array can be used to image the entire field of view at one time. Examples of commercial two-dimensional array detectors are Santa Barbara Focal Plane SBF 161, Sofradir 320×256 IRCMOS, Rockwell Scientific TCM 1150, and BAE Falcon. While such detector arrays are effective, they are generally relatively expensive. As an alternative to a detector having a two-dimensional array of detector elements, a less expensive linear array of elements may be used in a so-called push-broom system to step-by-step sweep across the image plane to obtain data for the entire two-dimensional area of the image. The image may then be assembled by the computer controller as a series of lines. As a further alternative, a single-element detector may be used which is mounted to move from pixel to pixel across the image plane in a raster-scan mode to build up an image one pixel at a time. Each of such structures may be considered an array detector as used herein. As an alternative to the use of array detectors, a single-element detector can be used which is maintained in a fixed position and the sample can be moved from position to position under the microscope in a raster scan manner to build up an image of the sample.

It is understood that the invention is not confined to the particular embodiments set forth herein as illustrative, but embraces all such forms thereof as come within the scope of the following claims.

What is claimed is:

1. An infrared microscope system receiving an infrared input beam from a source of infrared radiation comprising:
   (a) an infrared detector;
   (b) microscope optics arranged to receive an infrared light beam and focus it onto a sample at a sample position and to transmit light through the sample to provide a transmitted light beam;
   (c) an aperture element having an aperture therein through which a beam of infrared light may be passed;
   (d) infrared optical elements defining a beam path for the input beam from the infrared source through the aperture to the microscope optics, and a beam path for the transmitted beam from the microscope optics through the aperture to an output beam path and thence to the detector; and
   (e) at least one mirror element selectively interposable in the transmitted beam path from the microscope optics to the aperture element to define when interposed a beam path from the microscope optics to the output beam path and thence to the detector that does not pass through the aperture of the aperture element.

2. The system of claim 1 further comprising a source of infrared radiation providing an infrared input beam to the infrared optical elements.

3. The system of claim 2 wherein the source of infrared radiation is an infrared spectrometer.

4. An infrared microscope system receiving an infrared input beam from a source of infrared radiation comprising:
   (a) an infrared detector;
   (b) microscope optics arranged to receive an infrared light beam and focus it onto a sample at a sample position and to reflect light from the sample back through the optics to provide a reflected light beam and to transmit light through the sample to provide a transmitted light beam;
   (c) an aperture element having an aperture therein through which a beam of infrared light may be passed;
   (d) infrared optical elements defining an input beam path for the input beam from the infrared source through the aperture to the microscope optics, and a reflected beam path for the reflected beam from the microscope optics through the aperture to an output beam path and thence to the detector, and a transmitted beam path for the transmitted beam from the microscope optics through the aperture to the output beam path and thence to the detector; and
   (e) at least one mirror element selectively interposable in the input beam path from the source to the aperture element to define when interposed a first bypass beam path from the source to the microscope optics that does not pass through the aperture of the aperture element, at least one mirror element selectively interposable in the transmitted beam path from the microscope optics to the aperture element to define when interposed a second bypass beam path from the microscope optics to the detector that does not pass through the aperture of the aperture element, and at least one mirror element selectively interposable in the reflected beam path from the microscope optics to the aperture element to define when interposed a third bypass beam path from the microscope optics to the detector that does not pass through the aperture of the aperture element.

5. The system of claim 4 further comprising a source of infrared radiation providing an infrared input beam to the infrared optical elements.

6. The system of claim 5 wherein the source of infrared radiation is an infrared spectrometer.

7. An infrared microscope system receiving an infrared input beam from a source of infrared radiation comprising:
   (a) an infrared detector;
   (b) microscope optics arranged to receive an infrared light beam and focus it onto a sample at a sample position and to reflect light from the sample back through the optics to provide a reflected light beam;
   (c) an aperture element having an aperture therein through which a beam of infrared light may be passed;
   (d) infrared optical elements defining a beam path for the input beam from the infrared source through the aperture to the microscope optics, and a beam path for the reflected beam from the microscope optics through the aperture to an output beam path and thence to the detector; and
   (e) at least one mirror element selectively interposable in the reflected beam path from the microscope optics to the aperture element to define when interposed a beam path from the microscope optics to the detector that does not pass through the aperture of the aperture element.

8. The system of claim 7 further comprising a source of infrared radiation providing an infrared input beam to the infrared optical elements.

9. The system of claim 8 wherein the source of infrared radiation is an infrared spectrometer.

10. The system of claim 7 further including at least one mirror element selectively interposable in the beam path from the source to the aperture element to define when interposed a beam path from the source to the microscope optics that does not pass through the aperture of the aperture element.

11. The system of claim 10 further including infrared optical elements defining a beam path for a transmitted beam from the microscope optics through the aperture to an output beam path and thence to the detector; and at least one mirror element selectively interposable in the transmitted beam path from the microscope optics to the aperture element to define when interposed a beam path from the microscope optics to the output beam path and thence to the detector that does not pass through the aperture of the aperture element.

12. The system of claim 1, 4 or 11 wherein the microscope optics include an objective receiving an incoming beam along an input beam path and providing a reflected beam from the sample on the input beam path, and a condenser receiving infrared light transmitted through the sample and providing the transmitted beam to the microscope optics.

13. The system of claim 12 wherein the objective and the condenser are formed with Cassegrain reflective optics.

14. The system of claim 12 wherein the detector comprises an array detector having multiple detecting elements.

15. The system of claim 12 wherein the detector has a single detecting element.

16. The system of claim 12 wherein the infrared optical elements defining the input beam path for the input beam from the infrared source through the aperture to the microscope optics include a first curved mirror receiving a collimated input beam to reflect and focus the beam through the aperture of the aperture element, a second curved mirror receiving the beam passed through the aperture and reflecting the beam into a collimated beam, a first flat mirror receiving the collimated beam from the second curved mirror and reflecting the collimated beam on a beam path to a first reflective element which reflects the infrared beam to the objective of the microscope optics;
wherein the infrared optical elements defining the transmitted beam path for the transmitted beam from the microscope condenser through the aperture to the output beam path and thence to the detector include a second reflective element positioned to receive the collimated output beam from the condenser and direct the infrared light on a beam path to a second flat mirror, the second flat mirror reflecting the collimated beam on a beam path to a third curved mirror, the third curved mirror positioned to reflect the collimated beam into a focused beam that is directed through the aperture of the aperture element, a fourth curved mirror positioned to receive the beam passed through the aperture element from the third curved mirror and to reflect the beam into a collimated beam onto the output beam path;
and wherein the at least one mirror element selectively interposable in the transmitted beam path from the microscope optics to the aperture element comprises a mirror which is moveable into the beam path between the second flat mirror and the third curved mirror to reflect the collimated beam from the second flat mirror and a output beam path mirror moveable within the output beam path to receive the beam reflected from the mirror in the beam path between the second flat mirror and the third curved mirror and reflecting the beam onto the output beam path without passing through the aperture element.

17. The system of claim 16 including an input beam path mirror which is selectively interposable in the input beam path to reflect the input beam onto a beam path leading directly to the first reflective element without passing through the aperture.

18. The system of claim 16 wherein the first and second reflective elements are dichroic reflectors that reflect infrared and pass visible light.

19. The system of claim 16 wherein the at least one mirror element selectively interposable in the input beam path from the source to the aperture element comprises an input beam path mirror which is selectively interposable in the input beam path to reflect the input beam onto a beam path leading directly to the first reflective element without passing through the aperture;
and wherein the optical elements defining the reflected beam path for the reflected beam from the microscope optics through the aperture to the output beam path and thence to the detector include the optical mirror elements directing the input beam to the objective of the microscope optics and a first sluice mirror selectively interposable partially into the input beam path to pass part of the input beam to the optical elements directing the beam to the objective, and wherein the reflected beam from the objective travels along the same beam path as the input beam directed to the objective and travels in parallel therewith such that the reflected beam when passing along the input beam path is intercepted by the first sluice mirror when interposed and is reflected by the first sluice mirror onto the output beam path.

20. The system of claim 19 wherein the at least one optical element selectively interposable in the input beam path from the source to the aperture element comprises a second input beam path mirror which when interposed in the input beam path reflects the input beam away from the aperture element to bypass the aperture, and wherein the first flat mirror is moveable from a position reflecting the beam from the second curved mirror to a position in which it reflects the beam reflected from the second input beam path mirror onto a beam path leading to the first reflecting element to thereby bypass the aperture element.

21. The system of claim 19 wherein the at least one optical element selectively interposable in the reflected beam path from the microscope optics to the aperture element comprises a second sluice mirror selectively interposable partially into the beam path between the first flat mirror and the first reflecting element to pass a portion of the incoming beam on the beam path so that the incoming beam and the beam reflected from the sample occupy the same beam path in parallel with each other and wherein the second sluice mirror when interposed intercepts the reflected beam on the beam path between the first reflecting element and the first flat mirror to reflect the reflected beam toward a mirror which is interposed to reflect the reflected beam onto the output beam path so as to bypass the aperture.

22. The system of claim 19 wherein the at least one optical mirror element selectively interposable in the input beam path from the source to the aperture element and in the reflected beam path from the microscope optics to the aperture element comprise the first sluice mirror selectively interposed partially into the input beam path, a first input beam path mirror interposed to reflect the input beam onto the beam path to the first reflective element which reflects the input beam to the microscope objective, with the reflected beam from the objective returning on the same beam path as the incoming beam in parallel therewith and such that it is reflected by the first input beam path mirror onto the input beam path in parallel with the input beam where it is intercepted by the first sluice mirror and reflected onto the output beam path.

23. The system of claim 19 wherein the infrared detector comprises an array detector having multiple detecting elements.

24. The system of claim 19 wherein the first and second reflective elements are dichroic reflectors that reflect infrared and pass visible light.

25. A method for carrying out infrared microscopy comprising:
   (a) directing an infrared input beam on a beam path that focuses the beam onto and through an aperture and thence to a microscope objective at which the beam is focused at a sample, receiving the beam passed through the sample by a microscope condenser and directing a transmitted beam from the condenser on a beam path on which the beam is focused back onto and through the aperture, and directing the beam passed through the aperture to an infrared detector; and
   (b) redirecting the transmitted beam from the condenser so that the transmitted beam bypasses the aperture element and is directed to the detector.

26. The method of claim 25 further including redirecting the input beam to bypass the aperture and directing the input beam to the objective to focus the input beam on the sample without passing through the aperture.

27. The method of claim 26 wherein the detector comprises an array detector and further including focusing the transmitted beam that bypasses the aperture element to form an image of the sample on the array detector.

28. The method of claim 25 further including directing infrared light reflected from the sample through the objective to form a reflected beam and focusing the reflected beam onto and through the aperture and directing the beam passed through the aperture to a detector, and redirecting the reflected beam reflected from the objective to bypass the aperture and directing the reflected beam to the detector.

29. A method for carrying out infrared microscopy comprising:
   (a) directing an infrared input beam on a beam path that focuses the beam onto and through an aperture and thence to a microscope objective at which the beam is focused at a sample, directing infrared light reflected from the sample through the objective to form a reflected beam and focusing the reflected beam onto and through the aperture and directing the beam passed through the aperture to an infrared detector; and
   (b) redirecting the reflected beam from the objective to bypass the aperture and directing the reflected beam to the detector.

30. The method of claim 29 further including receiving the beam passed through the sample by a microscope condenser and directing a transmitted beam from the condenser on a beam path on which the beam is focused back onto and through the aperture, and directing the beam passed through the aperture to an infrared detector and redirecting the transmitted beam from the condenser so that the transmitted beam bypasses the aperture element and directing the transmitted beam to the detector.

31. The method of claim 29 further including redirecting the input beam to bypass the aperture and directing the input beam to the objective to focus the input beam on the sample without passing through the aperture.

32. The method of claim 31 further including receiving the beam passed through the sample by a microscope condenser and directing a transmitted beam from the condenser on a beam path on which the beam is focused back onto and through the aperture, and directing the beam passed through the aperture to a detector and redirecting the transmitted beam from the condenser so that the transmitted beam bypasses the aperture element and directing the transmitted beam to the detector.

33. The method of claim 31 wherein the detector comprises an array detector and further including focusing the reflected beam that bypasses the aperture element to form an image of the sample on the array detector.

34. An infrared microscope system receiving an infrared input beam from a source of infrared radiation comprising:
   (a) an infrared detector;
   (b) microscope optics arranged to receive an infrared light beam and focus it onto a sample at a sample position and to reflect light from the sample back through the optics to provide a reflected light beam;
   (c) an aperture element having an aperture therein through which a beam of infrared light may be passed;
   (d) infrared optical elements defining a beam path for the input beam from the infrared source through the aperture to the microscope optics, and a beam path for the reflected beam from the microscope optics through the aperture to an output beam path and thence to the detector; and
   (e) at least one mirror element selectively interposable in the beam path from the source to the aperture element to define when interposed a beam path from the source to the microscope optics that does not pass through the aperture of the aperture element.

35. The system of claim 34 further comprising a source of infrared radiation providing an infrared input beam to the infrared optical elements.

36. The system of claim 35 wherein the source of infrared radiation is an infrared spectrometer.

37. The system of claim 34 further including infrared optical elements defining a transmitted beam path from the microscope optics through the aperture to an output beam path and thence to the detector; and at least one mirror element selectively interposable in the transmitted beam path from the microscope optics to the aperture element to define when interposed a beam path from the microscope optics to the output beam path and thence to the detector that does not pass through the aperture of the aperture element.

38. A method for carrying out infrared microscopy comprising:
   (a) directing an infrared input beam on a beam path that focuses the beam onto and through an aperture and thence to a microscope objective at which the beam is focused at a sample, directing infrared light reflected from the sample through the objective to form a reflected beam and focusing the reflected beam onto and through the aperture and directing the beam passed through the aperture to an infrared detector; and
   (b) redirecting the input beam to bypass the aperture and directing the input beam to the objective to focus the input beam on the sample without passing through the aperture.

39. The method of claim 38 further including receiving the beam passed through the sample by a microscope condenser and directing a transmitted beam from the condenser on a beam path on which the beam is focused back onto and through the aperture, and directing the beam passed through the aperture to an infrared detector and redirecting the transmitted beam from the condenser so that the transmitted beam bypasses the aperture element and directing the transmitted beam to the detector.

* * * * *